Jan. 9, 1968     J. E. MORRISON, JR     3,362,361

PLANTING METHOD AND APPARATUS

Filed Sept. 28, 1964     4 Sheets-Sheet 1

INVENTOR
JOHN E. MORRISON JR.

Tweedale & Gerhardt
ATTORNEYS.

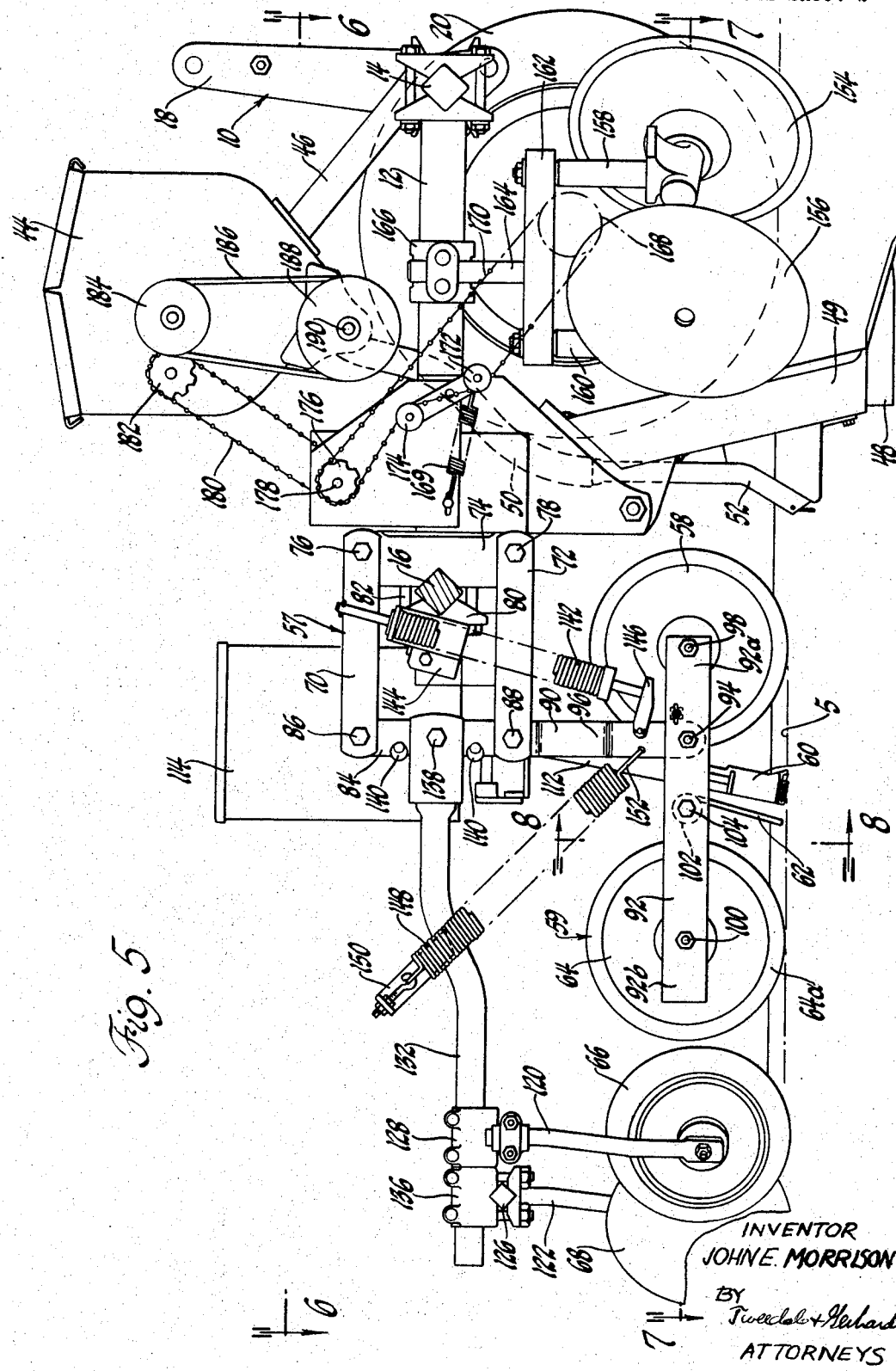

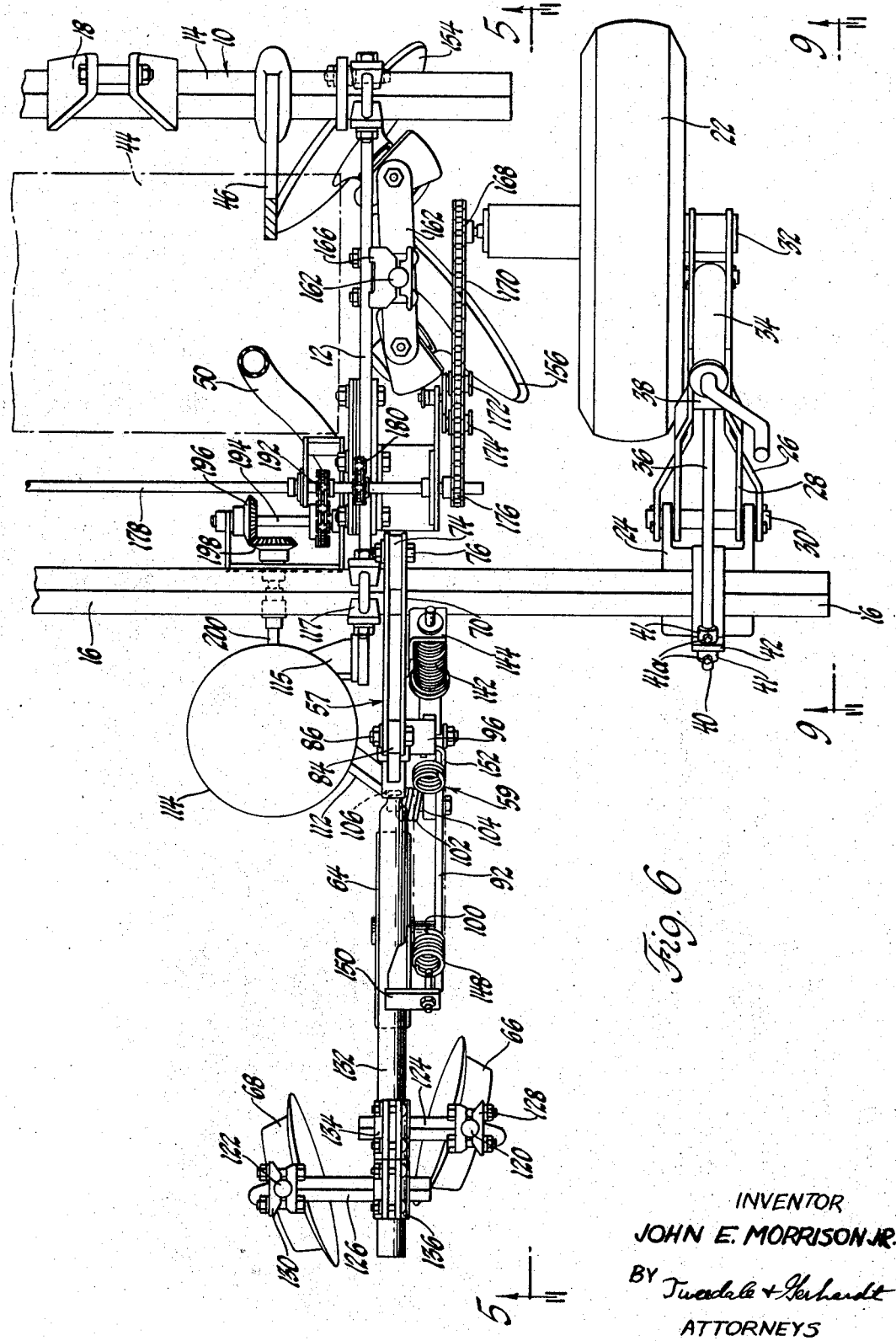

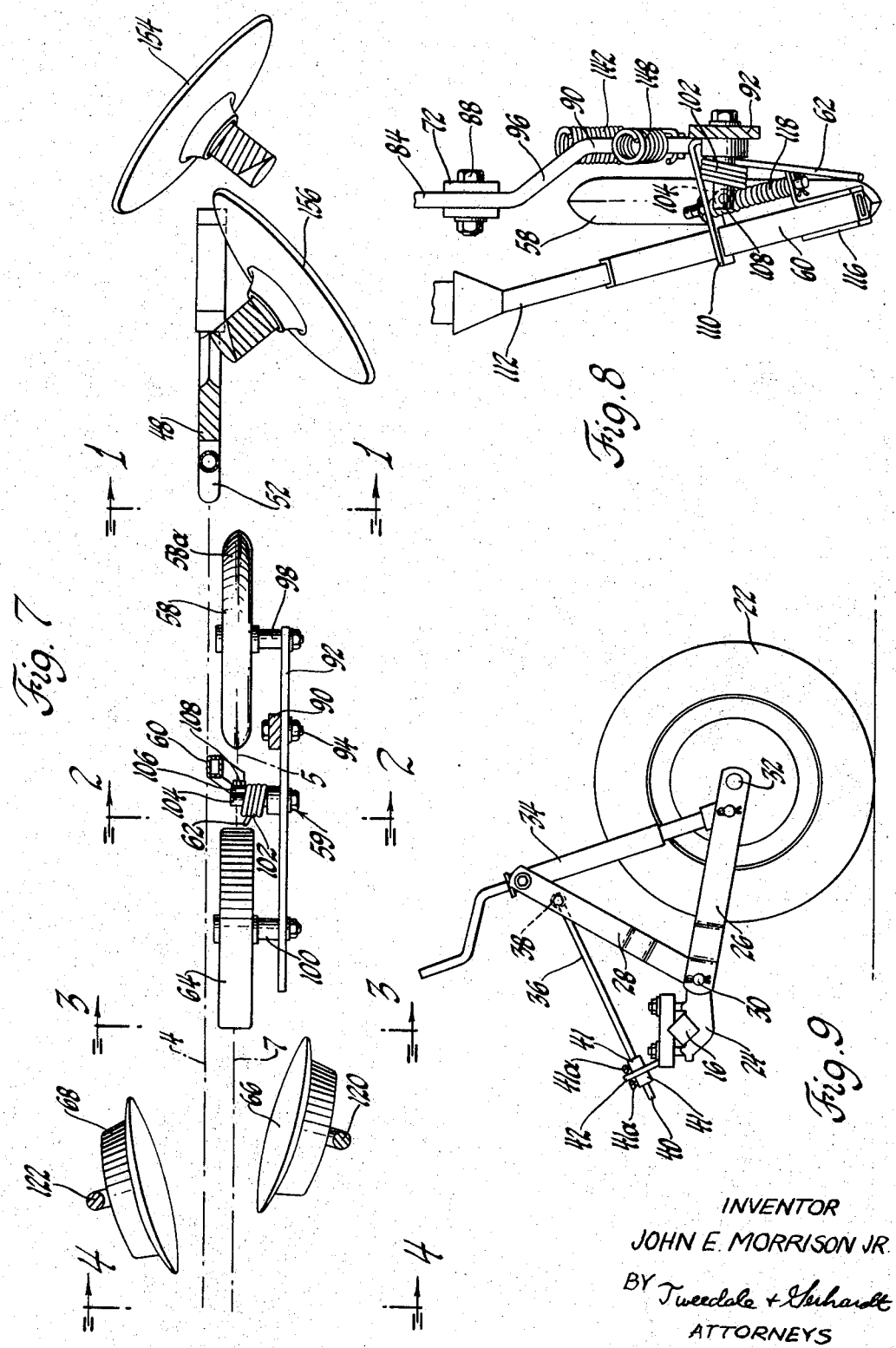

United States Patent Office 3,362,361
Patented Jan. 9, 1968

3,362,361
PLANTING METHOD AND APPARATUS
John E. Morrison, Jr., Royal Oak, Mich., assignor to Massey-Ferguson Inc., Detroit, Mich.
Filed Sept. 28, 1964, Ser. No. 399,654
8 Claims. (Cl. 111—73)

ABSTRACT OF THE DISCLOSURE

A method and apparatus for planting in which seeds are embedded in a strip of compacted soil which is surrounded by undisturbed soil and covered with loose soil to promote rapid germination of seeds by substantially reducing the loss of moisture to the surface due to capillary action. A seed trench is pressed into the surface of the ground adjacent a row of fertilizer, seeds are then deposited into the trench and the seeds are then pressed into the compacted soil beneath the trench so as to embed the seeds in the narrow compacted band or strip of soil which is surrounded by undisturbed soil. The embedded seeds are then covered with loose soil.

Planting apparatus for carrying out the above steps includes a trench forming a compacting assembly floatingly supported on a fixed frame by parallel linkage. Supported on the parallel linkage a tandem assembly including a forward wheel for pressing a groove into the surface for seeds, a seed boot for dispensing seeds into the trench, and a rear press wheel for following in the seed trench to press the seeds downwardly into the soil compacted beneath the trench by the forward wheel. Trailing the assembly is a pair of opposed covering discs which operate to cover the embedded seeds with loose soil.

---

This invention relates generally to planting, and more particularly to a minimum tillage method and apparatus for planting seeds in a manner to obtain maximum benefits from moisture and fertilizer.

In planting seeds for row crops and the like, compaction of the soil around the seed improves the moisture transference from the soil to the seed. The rate of germination of the seed is, in general, proportional to the amount of moisture available to the seed.

It has become common practice to deposit seeds and fertilizing material in adjacent, parallel rows spaced apart sufficiently to prevent direct contact between the seeds and the fertilizing material but near enough so that the fertilizing material is available as plant food. After the seeds and fertilizing material have been deposited in the rows, the rows are covered with soil, and the covered rows are compacted by a press wheel or the like.

When the compacted soil covering the rows dries, it forms a crust over the seeds. The crust not only impedes growth by making it difficult for the plants to force their way to the surface, but the close, compacted soil covering the seeds impedes germination by increasing the capillary action tending to cause the moisture to move from around the seeds to the surface where it is dissipated by evaporation.

An object of this invention is therefore to provide a method of planting in which rapid germination of seeds is promoted by substantially eliminating the loss of moisture to the surface due to capillary action.

A further object is to provide a method of planting in which the seeds are enclosed or enveloped in a compacted strip of soil beneath a covering of loose or non-compacted soil to break up the capillary action of the soil.

Still another object is to provide a method of planting seeds in a bed in the form of a narrow, concentrated envelope of compacted soil beneath a surface layer of relatively loose, non-compacted soil to increase the flow of moisture to the seeds and enhance the moisture retention properties of the seed bed.

An additional object is to provide a method of planting and fertilizing seeds in which the seeds are embedded in a strip or envelope of compacted soil adjacent to a row of subsurface fertilizer which is available as plant food for the seeds but cannot damage the seeds by direct contact, the compacted seed bed also being surrounded by non-compacted soil and covered by a surface layer of loose, non-compacted soil to break up capillary action tending to remove moisture from the seed bed.

A still further object is to provide planting apparatus for pre-compacting and shaping a narrow row or strip of surface soil to form a recessed seed trench and pressing the seeds into the pre-compacted soil beneath the trench to enclose or embed the seeds in compacted soil, and covering the compacted seed bed with loose, non-compacted soil.

A further object is to provide a method and apparatus for planting seeds in a compacted bed surrounded and covered by loose, non-compacted soil to increase moisture retention by the seed bed.

Yet another object is to provide a minimum tillage planter for planting seeds in a row of compacted soil adjacent a row of fertilizing material and covering the rows with loose soil to increase the moisture retention of the seed row.

Still another object lies in the provision of a planter for opening a furrow and depositing fertilizing material therein, forming a recessed, longitudinal seed bed by pre-compacting and shaping a narrow strip of soil parallel and adjacent to the fertilizer furrow, depositing seeds into the pre-compacted seed bed, embedding the seeds in a strip or row of compacted soil by concentrated pressing of the seeds into the pre-compacted soil beneath the recessed seed bed, and thereafter covering the compacted seed row with loose soil.

Another object is to provide a minimum tillage planter for sequentially pressing a narrow, longitudinal trench in the ground surface to pre-compact the soil beneath the trench, depositing seeds into the trench, pressing the seeds into the pre-compacted soil beneath the trench and further compacting the soil immediately surrounding the trench, and covering the embedded seeds with loose soil wherein the pre-compacting and final pressing force is maintained constant and independent of the weight of seeds and fertilizing material carried by the planter.

In carrying out the foregoing, and other objects, the seeds are embedded in a narrow band or row of compacted soil surrounded and covered by relatively loose, noncompacted soil. A trench or groove is pressed into the surface of the ground, adjacent a row of fertilizer, to provide a bed for receiving the seeds and for compacting the soil in a concentrated area beneath and adjacent the trench. The seeds are then deposited in the trench and preferably are lightly covered with soil. The seeds are then pressed into the compacted soil beneath the trench so as to embed the seeds in the narrow, compacted band or strip of soil. The embedded seeds are then covered with loose soil.

A planter embodying the invention for carrying out the foregoing method includes a trench forming and compacting assembly floatingly supported on a fixed frame by a parallel linkage. Pivoted onto the lower end of a depending leg carried by the parallel linkage is a tandem assembly including a forward wheel for pressing a groove into the surface, a seed tube for dispensing seeds into the trench, and a rear press wheel for following in the groove or trench to press the seeds downwardly into the soil compacted beneath the groove by the forward wheel. A depending spring finger between the seed tube and rear wheel operates to throw a light covering of soil over the seeds prior to the final compacting and embedding operation by the rear, press wheel. Trailing the assembly is a pair of opposed covering discs which operate to cover the embedded seeds with loose soil.

Other objects and advantages of the invention will become apparent from the following description taken in connection with the accompanying drawings in which:

FIGS. 1, 2, 3 and 4 are diagrammatic sectional views of the soil sequentially illustrating the steps of the planting method embodying the invention as viewed approximately on lines 1—1, 2—2, 3—3 and 4—4, respectively, of FIG. 7;

FIG. 5 is an elevational view, partially in section, of a planter embodying the invention taken along lines 5—5 of FIG. 6;

FIG. 6 is a partial plan view of the planter of FIG. 5 taken on lines 6—6 of FIG. 5;

FIG. 7 is a plan view of the ground working tools of the planter of FIG. 5 taken on lines 7—7 of FIG. 5;

FIG. 8 is a detail view of the seed dispensing tube, covering spring finger and trench forming wheel taken on lines 8—8 of FIG. 5; and FIG. 9 is an end view of one of the planter gauge wheels as viewed on lines 9—9 of FIG. 5.

Figure 1:
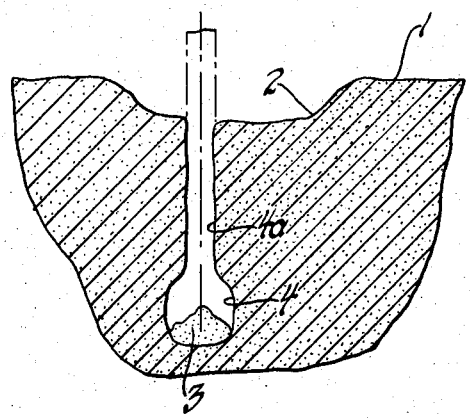

While specific examples of the invention are illustrated and described in the specification and accompanying drawings for purposes of clarity of understanding, it should be understood that the invention is not limited to these specific examples. On the contrary, all alterations falling within the scope and spirit of the invention is intended to be covered by the appended claims.

The steps of the planting method of the invention are sequentially illustrated in FIGS. 1, 2, 3 and 4. Reference numeral 1 indicates the ground line which is cut away at 2 to remove dry surface soil and trash and uncover the more moist, underlying soil. Under relatively wet conditions, removal of the surface soil is not necessary.

Fertilizing material 3 is deposited beneath the surface of cut away portion 2 in a trench, furrow or cavity 4. The furrow or cavity 4 may be formed by conventional disc, cultivating or subsoiling tools depending upon the nature and condition of the soil.

Figure 2:
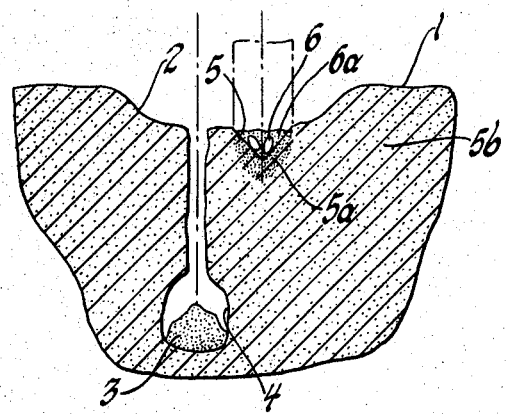

In FIG. 2, a seed trench or groove 5 is formed in the surface of cut away portion 2 by pressing a tool having the configuration of groove 5 into the surface. By pressing the groove into the ground, the soil 5a beneath and immediately surrounding groove 5 is compacted to a greater density than the surrounding undisturbed soil indicated by reference numeral 5b. Seeds 6 are placed in groove 5, and for more accurate placement of the seeds in a row, groove 5 is preferably of V-shaped cross-section so that the seeds will tend to fall into the apex of the groove.

Figure 3:
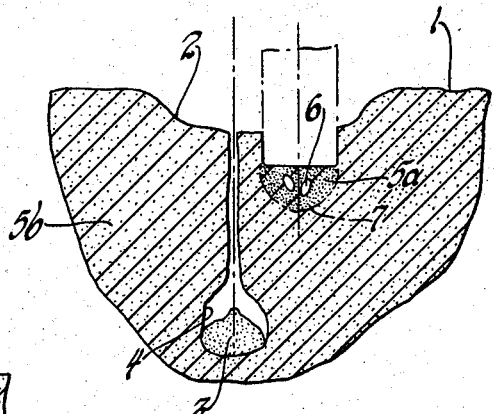

As shown in FIG. 3, seeds 6 are pressed downwardly into the compacted soil 5a beneath groove 5. The latter pressing operation is preferably carried out by a tool having a substantially rectangular configuration of a width approximating the width of the upper edges of the V-shaped groove 5 so as not to disturb, to any significant degree, the adjacent soil. Seeds 6 are thus embedded in a relatively narrow strip or band of compacted soil surround by relatively loose, undisturbed soil 5b.

Figure 4:
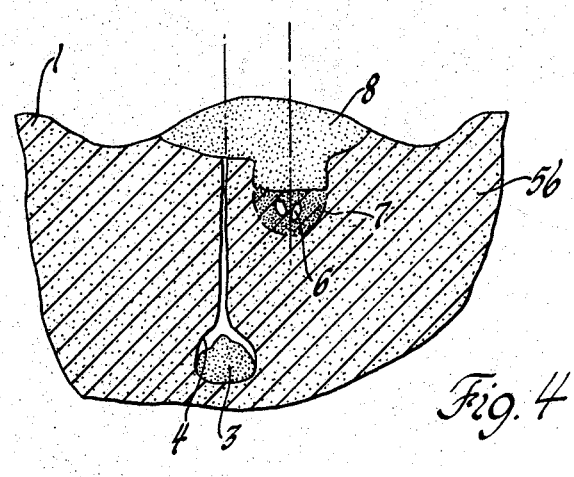

In order to assure that the seeds will be completely enveloped by the compacted soil, a light covering of loose soil 6a (FIG. 2) may be deposited in trench 5 over seeds 6 prior to the final pressing operation. The loose covering 6a is then compacted as the covered seeds are pushed into the soil immediately beneath groove 5. As shown in FIGS. 3 and 4, fertilizing material 3 is separated from the compacted seed bed or band 7 so as not to damage the seeds by direct contact, but is available as plant food for the roots that emerge from the seeds when they sprout.

As a final step, the embedded seeds are covered with loose soil as indicated by reference numeral 8 in FIG. 4. The close, compacted band of soil 7 surrounding seeds 6 tends to retain moisture to promote rapid germination of the seeds, and the voids between the particles of the loose, non-compacted soil 8 prevents capillary action that would draw moisture to the surface from around the seeds.

Apparatus for carrying out the foregoing method of planting is illustrated in FIGS. 5–9 wherein a frame is identified collectively be reference numeral 10. Frame 10 includes longitudinal side frame members 12, only one of which is visible in the drawings, having their leading and trailing ends secured, respectively, to a front transverse tool bar 14 and a rear transverse tool bar 16. Mounted at the center of front tool bar 14 is an A-frame 18 (FIG. 5) for securing the planter to the hitch mechanism of a tractor.

The planter may be supported solely by the three-point hitch mechanism of the tractor to which it is attached by means of A-frame 18, or alternatively, it may be supported on ground engaging gauge wheels 20 and 22 (FIGS. 5 and 6, respectively). As shown in FIGS. 6 and 9, wheel 22 is supported from a bracket 24 secured to rear tool bar 16. Pivotally mounted on bracket 24 is a strut 26 and a lift arm 28. Strut 26 and lift arm 28 are pivotally secured at one end to bracket 24 by means of a pin 30. The shaft 32 of wheel 22 is rotatably journalled in the free end of strut 26. Strut 26 and lift arm 28 are interconnected by means of a jack screw 34 by means of which members 26 and 28 can be either spread apart or drawn together to raise and lower wheel 22 relative to tool bar 16.

Raising and lowering of wheel 22 relative to tool bar 16 is effected by means of a T-bar 36 having its cross portion 38 pivotally secured to lift arm 28 intermediate its ends, and its opposite, straight portion 40 slideably received in the aperture of an upstanding ear 42 mounted on bracket 24. Annular stops or collars 41 are slideably mounted on the straight portion 40 of T-bar 36 on opposite sides of ear 42 and may be secured against movement relative to portion 40 by set screws 41a to prevent sliding movement of bar 36 relative to bracket 24 and ear member 42.

With the foregoing arrangement, the forward stop member 41 on the side of bar 36 toward wheel 22 can be positioned away from ear 42 permitting the wheel to "float" about pivot 30 with the planter supported solely by the hitch mechanism of the tractor.

Frame 10 supports a container 44 for fertilizing material by means of support arms 46 secured to the front tool bar 14 by suitable clamps (FIG. 5). Depending from longitudinal frame member 12 is a earthworking tool 48 for loosening the soil and forming a relatively deep furrow for the fertilizer material. In certain types of soil, crop yield increases after the soil has been aerated by deep tillage. Accordingly, earthworking tool 48 in the illustrated embodiment is shown as a subsoiler of the type which operates at depths of 6 to 10 inches for aerating the soil. The subsoiler forms a subsurface, enlarged cavity such as indicated at 4 in FIGS. 1–4, and the shank 49 forms a narrow, vertical slot 4a to the surface. Where deep tillage aeration is not required, tool 48 may take the form of a conventional cultivator shovel or disc for forming a furrow for receiving the fertilizer material. Preferably, a release mechanism is provided on the shank of tool 48 permitting the tool to swing rearwardly upon impact with buried objects to prevent damage.

Extending from the bottom of container 44 is a flexible tube 50 having its lower end connected with a tubular member 52 secured to the trailing edge of shank 49 of tool 48 for depositing fertilizing material from container 44 into the furrow or cavity 4 formed by tool 48.

Mounted on rear tool bar 16 at the trailing end of frame 10 is a parallel linkage system 57 which supports a trenching and compacting assembly 59 and permits vertical floating movement of assembly 59 relative to frame 10. Assembly 59 includes a seed trench forming and compacting wheel 58 for pressing a trench or groove 5 in the surface of the ground in spaced, parallel relationship with furrow 4, a seed dispensing tube 60 for depositing seed into groove 5, a seed covering element in the form of a spring finger 62, and a final compacting or press wheel 64 for pushing the seeds into the compacted soil beneath trench 5. Assembly 59 is trailed by a pair of opposed covering discs 66 and 68 which cooperate to throw soil inwardly to cover furrows 4 and 5 after the seeds have been deposited and finally compacted by wheel 64.

The parallel linkage 57 includes an upper link 70 and a lower link 72 having their forward or leading ends secured to the upper and lower ends of a notched, vertical support bar 74 by means of pivot pins 76 and 78, respectively. Support bar 74 is secured to tool bar 16 by a complementarily notched clamp member 80 and bolts 82. Links 70 and 72 have their trailing ends pivotally connected with a rear, vertical support link 84 by means of pivot pins 86 and 88, respectively. Vertical link 84 is formed with a depending leg or extension 90, and a support bar 92 is pivotally connected with the lower end of leg 90 by means of a pivot pin 94. Bar 92 has a leading portion 92a and a trailing portion 92b extending generally forwardly and rearwardly, respectively, from pivot pin 94. Leg 90 is formed with an offset 96 to position bar 92 to the right of the furrow 4 formed by tool 48 as viewed from the rear in FIG. 6.

Trench forming wheel 58 is journalled for rotation on a shaft 98 mounted on the forward or leading end of bar 92, and press wheel 64 is rotatably journalled on a shaft 100 mounted on the rear or trailing end of bar 92. The periphery 58a of wheel 58 is V-shaped in cross-section, and preferably is in the form of a zero pressure tire, that is, a hollow rubber tire in which air is free to pass into and out of. Such tires flex freely as the wheel passes over the ground preventing a build up of soil on the wheel. Similar results, however, can be obtained by an entirely metallic wheel having a cleaning scraper. Press wheel 64 likewise is preferably provided with a zero pressure tire 64a to prevent the build up of soil or mud on its rim.

Spring finger 62 forms the free end of a torsion spring 102 mounted on a shaft 104 secured to bar 92 between wheels 58 and 64. Spring 102 has one end 106 fixed to shaft 104 by a fastener 108 (FIG. 8) such that finger 62 exerts a biasing force toward the left, as viewed in FIG. 5, on spring 102 as the planter travels over the ground.

As shown in FIG. 8, seed tube 60 is slidably received in the apertured end of a bracket 110 secured to the bar 92. Tube 60 telescopically receives the end of a fixed tube 112 extending from the bottom of a seed container 114 supported by arms 115 (FIG. 6) which in turn is secured to tool bar 16 of fixed frame 10 by means of a clamp 117. Mounted on the lower end of tube 60 is a bracket 116 which supports one end of a spring 118, the other end of which is supported on the bracket 110 permitting the tube 60 to yield along the length of tube 112.

The shanks 120 and 122 of covering discs 66 and 68, respectively, are supported on tool bars 124 and 126 by means of clamps 128 and 130, respectively (FIGS. 5 and 6). Tool bars 124 and 126 are in turn supported on a pivotal support arm 132 near its trailing end by means of clamps 134 and 136, respectively. The support arm 132 is pivotally mounted at its leading end on link 84 by a pin 138 (FIG. 5). Support arm 132 is limited in its pivotal movement about pin 138 by adjustable stops 140 mounted on link 84 above and below pin 138. In FIG. 5, stops 140 are illustrated in the form of circular disc member ec-centrically mounted on link 84. Clockwise rotation of the upper stop 140 from the position illustrated increases the amount of upward pivotal movement permitted arm 132 about pin 138, and clockwise movement of the lower stop 140 from the position shown decreases the amount of downward pivotal movement permitted arm 132 about pin 138.

Parallel linkage 57 is restrained against movement with respect to the fixed frame 10 by a compression spring 142 fixed at its upper end to tool bar 16 by a bracket 144 secured to clamp 80. The lower end of spring 142 is seated against a bracket 146 pivotally mounted on leg 90 such that spring 142 exerts a downward force on assembly 59 through leg 90. The support arm 132 is biased in a downward or counter-clockwise direction about pivot 138 as viewed in FIG. 5 by a tension spring 148 secured at its upper end to a bracket 150 welded to support arm 132, and hooked at its lower end 152 to leg 90. The downward force exerted by spring 142 is thus transferred to support arm 132 by means of tension spring 148.

Mounted on the fixed frame 10 near the forward end of the planter are a pair of oppositely disposed discs 154 and 156 having standards 158 and 160, respectively, supported on a crosspiece 162. The crosspiece 162 in turn is supported on frame member 12 by a vertical member 164 secured to frame member 12 by a clamp member 166. Discs 154 and 156 serve to cut and remove trash and dry surface soil from a strip 8 to 12 inches wide in advance of tool 48 and assembly 59 to assure that the seeds will be covered uniformly with moist soil. Discs 154 and 156 are disposed to throw trash and dry soil to each side of the seed bed strip. Under conditions of negligible surface trash and moist surface soil, a standard rolling coulter may be substituted for the double trash discs to cut any trash that might be encountered.

The feed mechanism for dispensing material from containers 44 and 114 is driven at ground speed by the right gauge wheel 22 (FIG. 6). As shown in FIG. 6, and in outline in FIG. 5, a sprocket 168 is fixed to the shaft of wheel 22 for transmitting rotation of wheel 22 to a main input shaft 178 by means of a chain 170 extending around sprocket 168 and a sprocket 176 on the end of shaft 178. Idler rollers 172 and 174 support the lower run of chain 170 between sprockets 168 and 170 and maintain adequate tension on chain 170 through a spring 169. Rotation of shaft 178 is transmitted to a sprocket 182 mounted on the side of container 44 and having projecting teeth by means of chain 180. The projecting teeth of sprocket 182 drive a pulley 184 rotatably mounted on container 44 which in turn is connected with a pulley 188 by belt 186. The shaft 190 of pulley 188 drives feed mechanism for dispensing fertilizer material from container 44 through tubes 50 and 52.

Rotation of shaft 178 is also transmitted to a shaft 194 by means of a chain 192. Fixed to the end of the shaft 194 is a bevel gear 196 which meshes with a bevel gear 198 at the end of an input shaft 200 for the seed dispensing mechanism in container 114.

In operation of the embodiment illustrated in FIGS. 5–9 of the drawings, the depth of tool 48 and discs 154 and 156 may be controlled by the position of wheels 20 and 22 relative to frame 10, or alternatively, the planter wheels may be "floated" by loosening set screws 41a and removing the rear stop 41 from rod 36 and utilizing the tractor hydraulic system for controlling the depth.

Assuming wheels 20 and 22 to be locked in position by stop members 41 as shown in FIG. 5, discs 154 and 156 cooperate to clear a strip 8 to 12 inches wide as the planter advances over the surface of the ground as indicated at 2 in FIGS. 1–4. Subsoiler 48 penetrates the soil at a depth of 6 to 10 inches forming the furrow 4. The fertilizer is continuously fed into furrow 4 by tube 52 at the trailing end of the shank of subsoiler 48 and the seed trench forming wheel 58 forms trench 5 at a somewhat shallower depth than the furrow 4 and offset to one side of the fertilizer row approximately 2 inches.

In the arrangement shown, a greater amount of the vertical force exerted by spring 142 on leg 90 is transmitted to wheel 58 due to the closer proximity of pivot 94 to wheel 58 than to press wheel 64. The tandem arrangement provided by bar 92 provides a differential pressure on the soil between wheels 58 and 64. In the illustrated embodiment there is greater pre-compaction of the seed trench due to wheel 58 being nearer to pivot 94 than wheel 64. Under some conditions, it may be desirable to have greater compaction by wheel 64, in which case, bar 92 would be shifted forwardly, or toward the right in FIG. 5 to place wheel 64 nearer to the pivotal connection between bar 92 and the depending leg 90.

Seeds are dispensed into the trench 5 behind wheel 58 and the spring finger 62, following seed tube 60, continuously kicks a small amount of soil from the sides of groove 5 over the seeds. Press wheel 64 follows in the trench 5 formed by wheel 58 and flattens the sides of the V-shaped trench or groove in the manner illustrated in FIG. 3 to push the seeds into and further compact the soil beneath the trench. After wheel 64 passes over the trench, the seeds are embedded in the compacted strip or bed of soil indicated at 7 in FIGS. 3 and 4. Discs 66 and 68 then pass along the sides of the seed row throwing loose earth inwardly to cover the embedded seeds as indicated in FIG. 4 by reference numeral 8.

The only forces acting downwardly on the depending leg 90 are those exerted by spring 142 since containers 114 and 44 are supported on the fixed frame 10. Consequently, the constantly changing weight of seeds and fertilizing material in the containers has no effect on the force acting on wheels 58 and 64, as well as covering discs 66 and 68.

Since the widths of wheels 58 and 64 are substantially the same, the compaction of the soil is localized, with the soil adjacent to trench 5 being substantially undisturbed. The amount of compaction by wheels 58 and 64 can be varied by adjustment of spring 142.

It will be apparent to those skilled in the art that the invention is not limited to planting apparatus having the specific construction shown, but that various changes and modifications and the structure and arrangement of parts can be made without departing from the scope and spirit of the invention.

I claim:

1. In a planter including a frame: a parallel linkage including upper and lower parallel links, each having its leading end pivotally connected to the frame; a vertical support link pivotally connected with the trailing ends of said upper and lower links; a depending leg extending from said support link; a bar pivotally mounted intermediate its ends on said depending leg and having a leading portion extending forwardly from the pivotal connection between the bar and depending leg and a trailing portion extending rearwardly from the pivotal connection between the bar and the depending leg; a ground engaging trench forming tool carried by the lead-in portion of said bar for compacting a trench in the surface of the ground as the planter advances over the ground; a pressing tool carried by the trailing portion of said bar operable to follow said trench forming tool in the trench formed thereby to further compact the soil beneath said trench; means carried by said frame for depositing seeds in said trench behind the trench forming tool and in advance of the pressing tool; and means connected with said parallel linkage exerting a constant downward force on said tools through said depending leg.

2. The construction defined in claim 1 wherein said last named means comprises an adjustable compression spring connected between said depending leg and said frame.

3. The construction defined in claim 2 further including a support arm pivotally connected at its leading end to said support link; and a pair of oppositely disposed covering discs carried by the trailing end of said support arm in trailed relationship with said pressing tool and disposed laterally on opposite sides thereof for directing loose earth inwardly to cover said trench behind said pressing tool.

4. The construction defined in claim 3 further including spring means interconnected between said support arm and said depending leg for maintaining a constant vertical force on said covering discs.

5. The construction defined in claim 4 further including a seed covering tool carried by said bar between said trench forming and pressing tools operable to throw loose soil into said trench behind said trench forming tool and in advance of said pressing tool.

6. The construction defined in claim 5 wherein said trench forming tool comprises a wheel having a V-shaped periphery operable to press a V-shaped trench into the ground, and wherein said pressing tool comprises a wheel having a periphery which is substantially rectangular in cross-section and of substantially the same width as the upper edges of the V-shaped trench.

7. A planter including a frame having leading and trailing ends; an earthworking tool supported on the frame for opening a furrow in the ground as the planter travels over the ground; a tube secured to the trailing edge of the earthworking tool for dispensing fertilizer into the furrow; a parallel linkage including upper and lower parallel links each having their leading ends pivotally supported on said frame and a support link pivotally connected with the trailing ends of said upper and lower parallel links; an extension depending from said support link; a bar pivotally mounted intermediate its ends on said extension and having leading and trailing portions, respectively, extending generally forwardly and rearwardly from the pivotal connection between said bar and said extension; a trench-forming wheel having a zero pressure tire of substantially V-shaped cross-section rotatably mounted on the leading portion of said bar for pressing a substantially V-shaped trench in the surface adjacent and parallel to said furrow; a tube mounted on said bar rearwardly of said trench forming wheel for dispensing seeds into said trench; a depending spring finger mounted on said bar rearwardly of said seed dispensing tube engageable with the surface of the ground adjacent said trench and operable to throw soil into the trench to lightly cover the seeds therein; a compacting wheel rotatably mounted on the trailing portion of said bar and having a zero pressure tire of substantially the same width as the upper portion of the V-shaped trench operable to follow in said trench and press the seeds downwardly into the soil beneath the trench; a support arm having its leading end pivotally connected with the support link and its trailing end extending rearwardly of said press wheel; a pair of oppositely disposed covering discs carried by the trailing end of said support arm engageable with the ground on opposite sides of said trench for covering the compacted seeds with loose soil; a compression spring connected between said frame and said extension for exerting a vertical force on said trench forming wheel and said press wheel through said extension; and a tension spring connected between said extension and said support arm for exerting a vertical force on said covering discs.

8. A planter including a frame, a support member mounted on the frame for vertical, floating movement relative to the frame, a bar pivotally mounted intermediate its ends on said support member and extending in a direction parallel to the direction of travel of the planter, a ground engaging trench forming wheel rotatably mounted on said bar forwardly of the pivotal connection between said bar and said support member, a ground engaging press wheel rotatably mounted on said bar rearwardly of the pivotal connection between said bar and said support member, and means connected with said support member for exerting a constant, downward force on said wheels through said pivotal connection, said trench-forming wheel and said press wheel being spaced from said pivotal connection to provide a predetermined ground engaging force distribution between said wheels.

References Cited

UNITED STATES PATENTS

| | | | |
|---|---|---|---|
| 1,635,866 | 7/1927 | Townsend et al. | 111—85 |
| 1,857,749 | 5/1932 | White | 111—73 |
| 1,882,603 | 10/1932 | Honer | 111—85 |
| 2,155,443 | 4/1939 | Parks et al. | 111—85 X |
| 2,155,891 | 4/1939 | Campbell | 111—85 |
| 2,515,368 | 7/1950 | Brunner | 111—73 |
| 2,963,998 | 12/1960 | Bliss | 111—85 |
| 3,217,674 | 11/1965 | Williams | 111—85 X |
| 3,219,000 | 11/1965 | Leach et al. | 111—85 X |

ABRAHAM G. STONE, *Primary Examiner.*

A. E. KOPECKI, *Assistant Examiner.*